J. H. WERNER.
GRADE MEASURING DEVICE.
APPLICATION FILED MAR. 13, 1917.
1,320,352.
Patented Oct. 28, 1919.
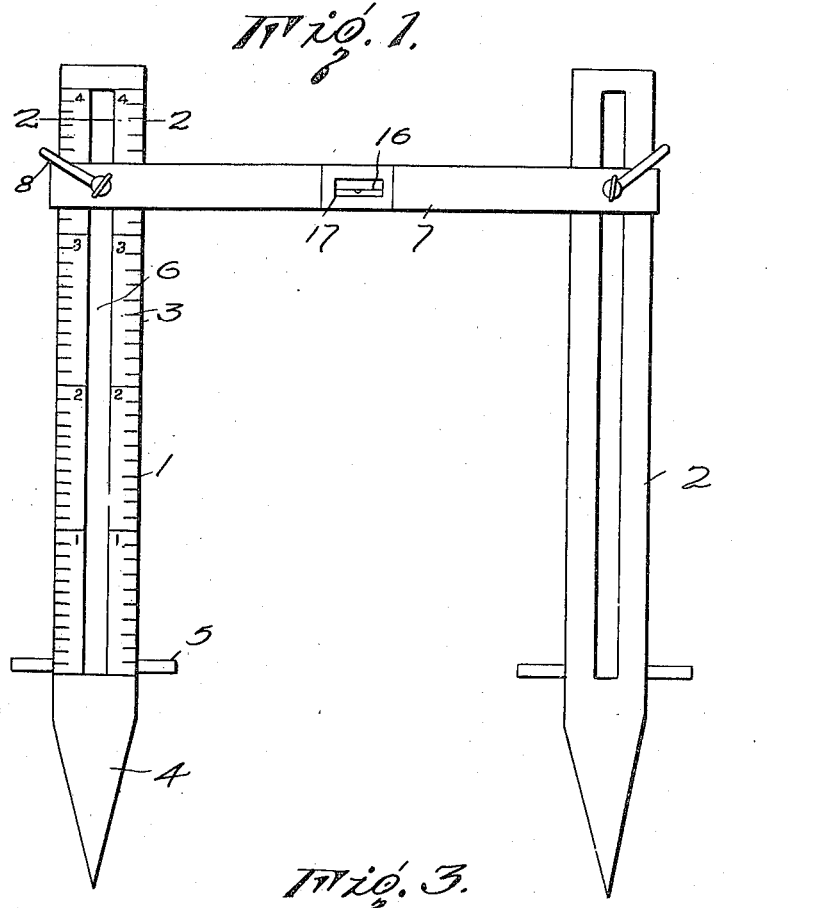
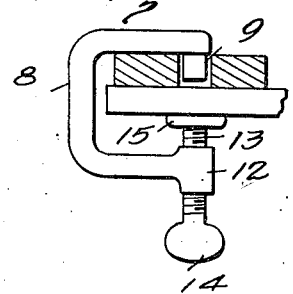
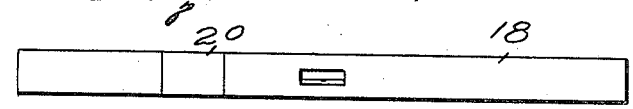
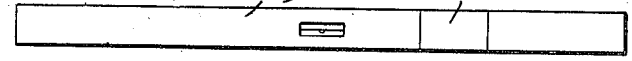
John H. Werner
Inventor

UNITED STATES PATENT OFFICE.

JOHN H. WERNER, OF MORGAN, MINNESOTA.

GRADE-MEASURING DEVICE.

1,320,352.   Specification of Letters Patent.   Patented Oct. 28, 1919.

Application filed March 13, 1917. Serial No. 154,488.

*To all whom it may concern:*

Be it known that I, JOHN H. WERNER, a citizen of the United States, and resident of Morgan, in the county of Redwood and State of Minnesota, have invented certain new and useful Improvements in Grade-Measuring Devices, of which the following is a specification.

This invention relates to new and useful improvements in grade measuring devices, and the primary object of the invention is to provide an implement to be used by mechanics in laying pipe for water distribution or drainage, by means of which the pipe may be laid at a certain depth or level relative to a fixed point.

Another object of the invention is to provide a grade measuring device of this character which includes a plurality of spaced straight edge bars having differently arranged targets thereon, so that the same may be easily sighted from a distant point, so as to verify the correctness of their positioning.

A further object of the invention is to provide a device of this character which is easily and simply constructed, inexpensive to manufacture, and one which will be very efficient in operation.

With these and numerous other objects in view, my invention consists of the novel features of construction, combination and arrangement of parts which will be hereinreferred to and more particularly pointed out in the specification and claim.

In the accompanying drawing:

Figure 1 is a front elevation of one of the improved grade measuring devices.

Fig. 2 is an enlarged horizontal sectional view taken on line 2—2 of Fig. 1,

Fig. 3 is a front elevational view of one of the straight edge bars, with the target positioned differently, and Fig. 4 is a front elevational detail of another of the straight edge bars showing still another arrangement of target thereon.

In describing my invention I shall refer to the drawing in which similar reference characters designate corresponding parts throughout the several views.

Heretofore in laying pipes where the level and contour have been previously ascertained it has been the practice to affix certain marks at regular intervals along the trench with directions thereon that the axial line of the pipe should be a certain distance below each mark. It was necessary to project the line of marks over the trench, and measure down the required distance to ascertain this line. When the trench edge was not level the straight line would have to be projected an arbitrary distance above the trench, and then that distance added to the required depth to ascertain level of pipes. This was a very laborious and complicated operation to the mechanics that are employed for this task.

My new and improved grade measure affords a simple means for carrying out this operation, and one that may be easily operated. The device consists of three pairs of vertical uprights, the said uprights being substantially alike in their general features of construction, and for the sake of brevity I will only specifically describe one pair. The vertical uprights shown in Fig. 1 of the drawing, are designated by the numerals 1 and 2, the upright 1 having on one side thereof a graduated scale 3 in tenths of inches on the one side and inches on the other extending from a point adjacent the bottom to its top. The bottom portions of the uprights are pointed as shown at 4, so that the same may be driven into the ground adjacent the opposite edges of the trench. The uprights are provided with laterally projecting offset portions 5, so as to designate the ground level, and the grade mark that has been previously ascertained. Each of the uprights is provided with longitudinally extending slots 6, which extend substantially the entire length of the same, running from the ground level to a point adjacent the top.

Extending across the top of the trench that is positioned between the two uprights is a horizontally extending straight edge bar 7, which has its opposite end portions associated with the uprights. The ends of the bar 7 are connected with the uprights by clamping brackets 8, whereby said bar is vertically adjustable with respect to the uprights, and is adapted to be held in any desired position. One of the ends of the bar engages the upright 1 flush with the face thereof on which the graduated scale is positioned, so that the bar may be adjusted for various measurements. The clamping brackets 8 are substantially U-shaped rods, having one of their ends formed with a laterally projecting inwardly extending stud 9 thereon, that is adapted to be positioned in the slot 6 in the upright, while the opposite end of said bracket has formed thereon a sleeve 12, in which is threaded a clamping screw 13 having a handle 14 on its outer end, and an enlarged portion 15 on its inner end adapted to engage the adjacent face of the bar 7. It is obvious that by means of this clamping bracket the bar 7 may be held in various adjusted positions with respect to the upright.

As has been hereinbefore stated three pairs of uprights are provided, and each pair is provided with a horizontally extending straight edge bar that has a distinctive target or identifying mark thereon. All of the straight edge bars have positioned in the center thereof a spirit level 16, while the straight edge bar that is positioned between the uprights 1 and 2 has painted on its center portion a distinguishing mark, preferably a color band 17. The other straight edge bars as designated by the numerals 18 and 19, and which are shown in Figs. 3 and 4 of the drawing, have color bands 20 and 21 thereon disposed on opposite sides of the center point while in addition all of these straight edge bars are painted red, or other dark color so that the color bands may be more easily distinguished from a distance. It is of course to be understood that three of these devices are employed being arranged in transverse relation to the ditch and in longitudinally spaced relation with respect to each other so that a surveyor or engineer when located a considerable distance from the devices and longitudinally or in alinement therewith can readily discern or locate the white color bands on the transversely disposed straight edge bars 7 and thereby make notation so that the proper positioning of the said bars 7 with respect to each other, such as in horizontal alinement, may be effected. The fact that the color bands are in non-alining relation with respect to each other when viewed from points longitudinally of the three devices facilitate the sighting by the engineer or surveyor.

In operation, let it be supposed that it is desired to lay a pipe six feet below the top of the grade mark, which has previously been furnished by an engineer, and there is a slope between the grade mark and line of trench. The upright 1 upon which the scale 3 is positioned is placed into the ground, and has the bottom of the scale disposed in alinement with the top of the grade mark. The straight edge rod 7 is then adjusted so as it will be held horizontally, the position of the same being ascertained by the spirit level, say three feet above the grade level. The opposite end of the straight edge bar will be securely held in position by the upright 2, as the same is also adjustably connected therewith. When in this position the distance from the straight edge bar is measured to the bottom of the trench, and three feet deducted, to ascertain where to lay the pipe. It is obvious that the employment of pairs of spaced uprights on opposite sides of the trench insure a much more efficient and simply operated means for measuring the depth, as the straight edge bar is securely held in position at all times. When the devices are in position in spaced intervals along the trench, owing to the fact that each of the straight edge bars is provided with a distinguishing mark, they may be identified from a distant point and located at a glance.

From the foregoing description of the construction and operation of my grade measuring device, the manner of applying the same to use, and the operation thereof will be readily understood, and it will be seen that I have provided a simple and efficient means for carrying out the objects of this invention.

Having thus fully described my invention, what I claim as new, and desire to secure by Letters Patent, is:

In a grade measuring device, a pair of vertically arranged ground engaging uprights having penetrating ends adapted to be anchored in the ground on opposite sides of a trench and provided with vertical slots, one of the uprights being provided with graduations, stop arms extending laterally from the uprights near the penetrating ends thereof, a straight edge bar arranged between the uprights, a spirit level on the bar, a target on the bar, and means engaging said slots for removably clamping the bar in various vertically adjusted positions on the uprights.

In testimony whereof, I affix my signature hereto.

JOHN H. WERNER.

Copies of this patent may be obtained for five cents each, by addressing the "Commissioner of Patents, Washington, D. C."